Figure 1:
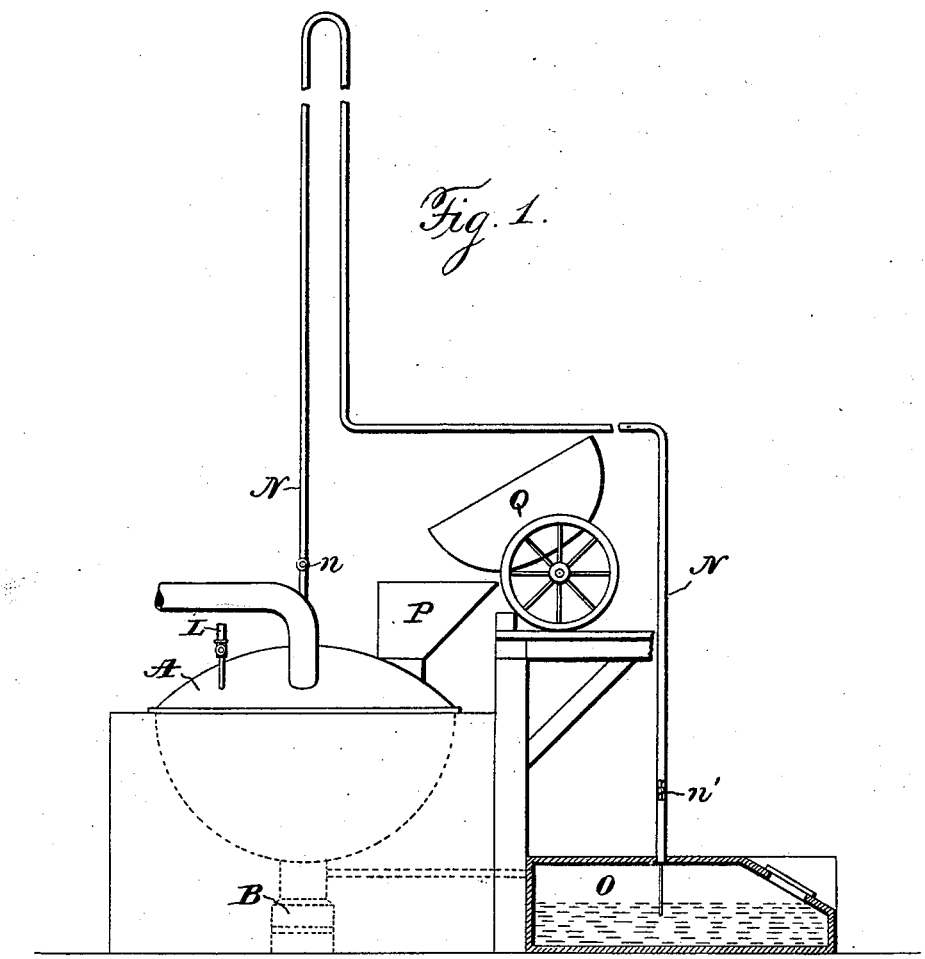

No. 689,535. Patented Dec. 24, 1901.
S. H. BROWN.
PROCESS OF EXTRACTING GREASE FROM GARBAGE.
(Application filed Feb. 20, 1900.)
(No Model.) 2 Sheets—Sheet 1.

Witnesses:
Jas. E. Hutchinson.
Henry C. Hazard.

Inventor.
Samuel H. Brown
by Pinell and Russell
his Attorneys

No. 689,535. Patented Dec. 24, 1901.
S. H. BROWN.
PROCESS OF EXTRACTING GREASE FROM GARBAGE.
(Application filed Feb. 20, 1900.)
(No Model.) 2 Sheets—Sheet 2.
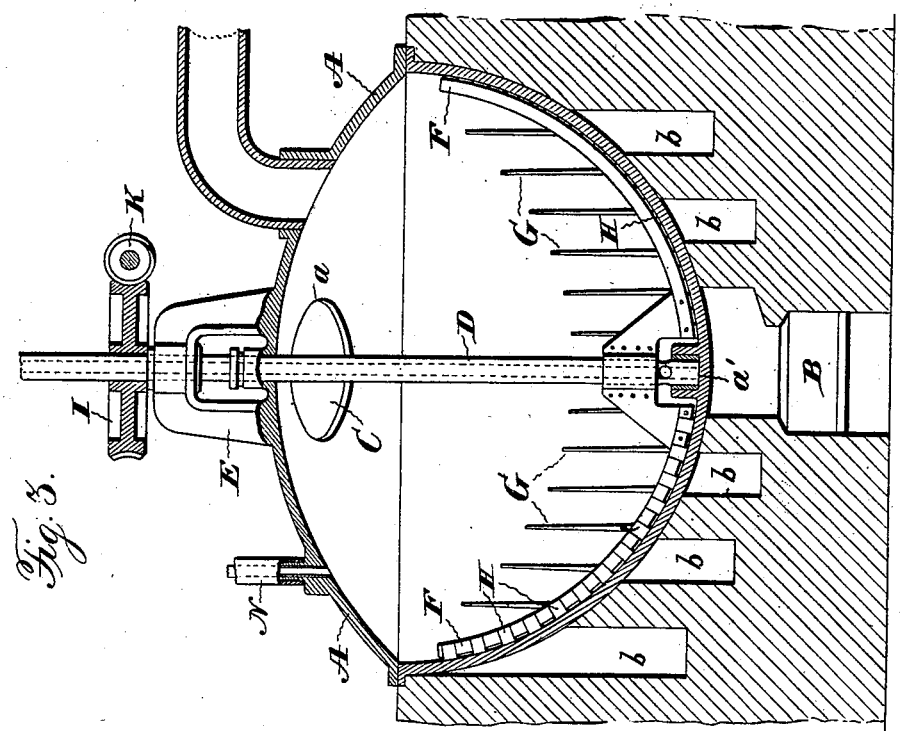
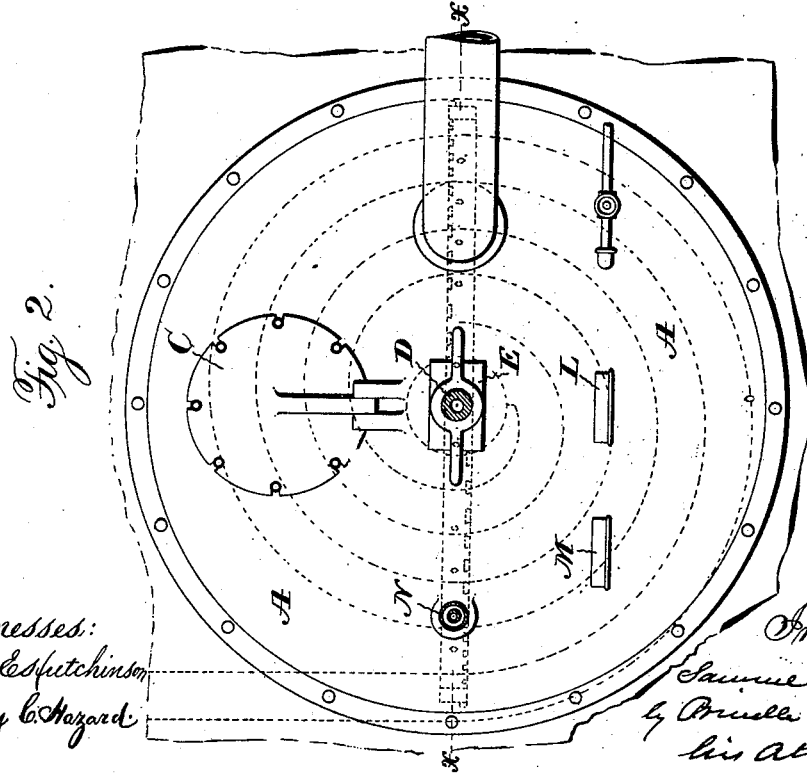

UNITED STATES PATENT OFFICE.

SAMUEL H. BROWN, OF WASHINGTON, DISTRICT OF COLUMBIA, ASSIGNOR, BY DIRECT AND MESNE ASSIGNMENTS, TO THE AMERICAN DIGESTER MANUFACTURING COMPANY, A CORPORATION OF NEW JERSEY.

PROCESS OF EXTRACTING GREASE FROM GARBAGE.

SPECIFICATION forming part of Letters Patent No. 689,535, dated December 24, 1901.

Application filed February 20, 1900. Serial No. 5,948. (No specimens.)

*To all whom it may concern:*

Be it known that I, SAMUEL H. BROWN, of Washington, in the District of Columbia, have invented certain new and useful Improvements in Methods of Treating Garbage, &c., for the Extraction of Oils, &c.; and I do hereby declare that the following is a full, clear, and exact description thereof, reference being had to the accompanying drawings, in which—

Figure 1 is a view in elevation of one form of my apparatus with the condensing-receptacle for the oils and fats shown in section. Fig. 2 is a top plan view of the digester and the furnace; and Fig. 3, a vertical section through the same on the line *x x*, Fig. 2.

Letters of like name and kind refer to like parts in each of the figures.

The object of my invention is to recover from garbage and other waste substances their useful and valuable constituents and obtain a residue of value as a fertilizer; and to this end said invention consists in the method involving the treatment and steps substantially as hereinafter specified and claimed.

It will sufficiently illustrate my invention to describe it as employed in the treatment of garbage; but of course this selection of a particular material for description is to be taken as in no wise limiting the scope of the invention in respect to the matter to be treated.

For the treatment of garbage, I preferably employ apparatus such as that shown in my United States Patent No. 664,720, issued December 25, 1900, which comprises a digester A, preferably of cast-iron and made in two sections united on a horizontal plane, the lower section being hemispherical in form and the upper section of concavo-convex form, but much less than a hemisphere. The two sections have annular flanges at their abutting edges, by which they are bolted together, the joint being packed with asbestos gaskets. Beneath the digester is a furnace B, the heat of which is applied directly to the under side of the digester and which is preferably of the construction shown, which comprises a central chamber and a flue or passage *b*, leading off therefrom in the form of a spiral, this construction being employed because of the utilization of the heat that it affords and the uniform application of heat to the entire digester. Any kind of fuel desired may be used in the furnace; but oil is preferably used.

In the upper section of the digester, at one side of the center, is a manhole *a*, having a hinged cover C, that is adapted to be securely fastened over the hole. The material to be treated is introduced into the digester through the manhole.

At the center of the digester A is a vertical shaft D, the lower end of which is supported by and journaled in a suitable bearing *a'* on the bottom of the digester, and whose upper end passes through an opening in the upper section to a point above the latter. On the top of the upper section is an open frame E, having a bearing for journaling the shaft, and a suitable stuffing-box is provided where the shaft passes through the upper section. Attached to the lower end of the shaft D are two diametrically opposite radial arms F and F, preferably of forged steel, that lie close to but do not touch the inner surface of the lower section, being curved on an arc concentric with such surface. Projecting from the upper side of each of said arms is a series of parallel equidistant knives G and G, that serve, when the arms are in position, to macerate or cut up and stir the material within the digester. Upon one side of each of said arms F and F is a series of wide radially-arranged knives or scrapers H and H, that extend to and touch the inner surface of the digester and operate to cut or scrape from such surface any matter tending to adhere thereto. The knives G and G are secured to the arms by having their lower ends fastened in openings therein, and knives H H are secured to the arms by being provided with dovetailed shanks that fit and are secured within dovetailed slots in the sides of the arms, and the arrangement of the knives H and H in the respective bars is such that the knives of one bar travel over the surface of the digester that lies between the paths of adjoining knives and of the other bar, so as to avoid the travel of two knives over the same surface and provide spaces through which the material may pass.

As one of various means that may be used to revolve the shaft D to move the knife-carrying arms, I show a worm-wheel I upon the upper end of the shaft and a worm K meshing therewith, which receives power from any suitable source.

To enable the accurate regulation of the temperature in the digester, a pyrometer L is applied thereto, and for showing the pressure within the digester a pressure-gage M is provided, the connections between these and the digester being through the top of the latter.

From the digester a pipe N passes to a tank O, located at some convenient point, which is kept partially filled with water containing sulfuric acid, the solution being a one-half-of-one-per-cent. solution, into which the end of the pipe projects, so as to be always submerged therein. Said pipe N is provided with a valve n, by which communication between the digester and tank may be controlled at will. Just above the tank O the pipe n has a check-valve n'; but to provide for the contingency of failure of said valve to operate the pipe is carried in a loop to a height above which atmospheric pressure will not raise water.

A hopper P is shown for directing garbage into the digester from collecting-carts, one of which, Q, is shown in the drawings.

The practice of my method with the apparatus described, in the treatment of garbage, is as follows: The digester A is charged with garbage through the manhole, the charge being leveled down by the arms and knives carried by the shaft D, which is revolved, and there is mixed in with the garbage an alkaline base, such as soda ash or caustic potash, but preferably the former and in the form of a solution. I use five pounds of fifty-eight-per-cent. soda ash, and preferably Solvay soda ash, in solution, to twenty hundred weight of garbage containing sixty-five pounds of grease by laboratory estimate. The digester, being closed air-tight, is subjected to heat from the furnace for about two hours, the temperature being about 400° Fahrenheit. The oils and fats present in the garbage are thus liberated, but are prevented from decomposing by the presence of moisture due to the water in the garbage and the soda-ash solution, and by reason of the presence of the alkaline base are brought to what seems to be and what I believe is a saponified condition. By having the alkaline base present in the digester ready to combine with the oils and fats as they are freed from the garbage I am able to recover about eighty-five per cent. of the oils and fats—a much larger proportion than is possible by mere volatilization. During this treatment the shaft D is revolved to effect the maceration and agitation of the mass, to keep the inner surface of the digester free from a coating that would otherwise adhere thereto and materially obstruct the passage of the heat, and to bring the material into intimate and uniform contact with the heated surface of the metal. The heat is thus most effectively and economically used, especially by reason of the keeping of the digester-wall free from coating and the bringing of the different portions of the mass directly into contact therewith. At the expiration of the two hours the valve n in the pipe N is opened, and by reason of the pressure which has been produced in the digester (from five to ten pounds) the saponified oils and fats, together with such aqueous vapors and gases as may have been generated, are forced out through said pipe and are thereby delivered into the acidulated water in the tank O, by which the vapors are condensed, the alkali separated from the oils and fats by the acid in the water, the oils and fats coming to the surface of the water in a pure state, and whatever ammonia is present crystallized in the tank in the form of a sulfate. All but about fifteen per cent. of the oils and fats are recovered by the treatment thus far described, and in the further operation the temperature in the digester is raised to effect the decomposition of as much of the remainder as possible into gaseous form and the evaporation of all moisture, so that the residuum in the digester will be virtually free from oil and carbonized or charred, so as to be best fitted for its purpose as a fertilizer. This last stage of the treatment is continued about four hours, during which time the knives and scrapers are kept in motion, so that the residuum in the digester is thoroughly desiccated, comparatively free from oil, and pulverized. In the last two hours of the operation nearly pure inflammable gas is given off, and being passed to the tank O beneath the oils therein is carbureted in passing up through such oils and fitted for burning as an illuminating-gas.

It will be seen that by my method I recover a very large per cent. of the oils and fats. Ammoniacal salts make an illuminating-gas and produce a residuum that is dry, with but little oil in it, and in the best possible condition for fertilizing purposes; and yet this is all done economically, as in the saponification of the oils and fats a comparatively low temperature and low pressure are employed. I have found that the best results are secured in the separation of the oils and fats after having been saponified if the saponification is not carried to the point of actually making soap, for the more complete the saponification the smaller is the proportion of oils and fats recovered. I therefore use a proportion of alkaline base and carry on the treatment for a length of time insufficient to effect complete saponification. It is also important not to use alkali in excess, because of the loss of nitrogen in the tankage or residuum which would result should there be more alkali than enough to combine with the oils and fats.

Besides garbage, cotton-seed and other oil or fat containing material can be treated by my method.

Having thus described my invention, what I claim is—

1. The method of extracting oils, fats, &c., which consists in subjecting the matter to be treated to heat to liberate the oils, &c., saponifying the latter and then separating them from the saponifying agent, substantially as described.

2. The method of extracting oils, fats, &c., which consists in subjecting the matter to be treated to heat to liberate the oils, &c., and in the presence of a saponifying agent, and then separating them from the saponifying agent, substantially as described.

3. The method of treating garbage, &c., which consists in subjecting the same to heat in the presence of moisture, to liberate the oils, &c., removing the latter and then subjecting the residue to a higher degree of heat, substantially as described.

4. The method of treating garbage, &c., which consists in subjecting the same to heat in the presence of moisture, saponifying the oils and fats thereby liberated, removing the saponified product and then subjecting the residue to a higher degree of heat, substantially as described.

5. The method of extracting oils, fats, &c., which consists in subjecting matter containing the same to heat to liberate the oils, &c., combining the latter with an agent from which they can be set free by an acid, and then treating the product with an acid, substantially as described.

6. The method of extracting oils, fats, &c., which consists in subjecting matter containing the same to heat to liberate the oils, &c., combining the latter with an agent from which they can be set free by an acid, and then treating the product with acidulated water, substantially as described.

7. The method of extracting oils, fats, &c., which consists in subjecting matter containing the same to heat to liberate the oils, &c., saponifying the latter, and then passing the saponified product into a bath of acidulated water, substantially as described.

8. The process of treating garbage or other oil or fat containing materials for removing the oil and fat therefrom, which consists in heating the material in the presence of a saponifying agent to saponify the oil or fat therein, and passing the saponified product into a bath of acidulated water, substantially as described.

9. The process of treating garbage or other oil or fat containing material to obtain the oil or fat therefrom, which consists in heating the material in a suitable closed chamber to keep the air away from the mass, subjecting the oil or fat in the mass to the action of a saponifying agent, and passing the saponified product into a bath of water to which sulfuric acid has been added, substantially as described.

10. The method of treating garbage, &c., which consists in subjecting the same to heat in the presence of moisture, to liberate the oils, &c., removing the latter to a suitable vessel, generating a gas or gases from the residue, and passing the same through the oils, &c., in such vessel, substantially as described.

11. The method of treating garbage, &c., which consists in subjecting the same in a suitable digester to heat to liberate the oils, &c., and in the presence of a saponifying agent, passing the saponified oils to a vessel in which they are separated from such agent, generating a gas or gases from the residue in the digester, and passing such gas or gases through the oils, &c., in said vessel, substantially as and for the purpose described.

In testimony that I claim the foregoing I have hereunto set my hand this 29th day of December, 1899.

SAMUEL H. BROWN.

Witnesses:
 JAS. E. HUTCHINSON,
 SIDNEY BIEBER.